United States Patent [19]

Boeckeler

[11] Patent Number: 4,800,123
[45] Date of Patent: Jan. 24, 1989

[54] IN-MOLD SCRATCH RESISTANT COATING FOR PEROXIDE CURABLE URETHANE ELASTOMERS

[75] Inventor: Rudolph H. Boeckeler, Grafton, Wis.

[73] Assignee: Freeman Chemical Corporation, Port Washington, Wis.

[21] Appl. No.: 92,609

[22] Filed: Sep. 3, 1987

[51] Int. Cl.⁴ .............................................. B32B 27/00
[52] U.S. Cl. .................................. 428/424.2; 214/1.4; 351/159; 350/409
[58] Field of Search ....................... 428/423.1, 424.2; 264/22, 25, 1.4, 1.7, 2.6, 350; 350/409; 351/159

[56] References Cited

U.S. PATENT DOCUMENTS

| | | | |
|---|---|---|---|
| 4,282,285 | 8/1981 | Mohiuddin | 428/424.2 |
| 4,319,811 | 3/1982 | Tu | 428/412 |
| 4,642,267 | 2/1987 | Creasy et al. | 428/424.2 |
| 4,666,437 | 5/1987 | Lambert | 428/424.2 |
| 4,729,914 | 3/1988 | Kliment et al. | 428/424.2 |

Primary Examiner—Edith Buffalow
Attorney, Agent, or Firm—John C. Cooper, III; Fred Wiviott; C. Thomas Sylke

[57] ABSTRACT

A scratch resistant coating for peroxide curable urethane elastomers comprises a radiation curable composition including at least one polyfunctional monomer having three or more acryloloxy groups per molecule, preferably five or more acryloloxy groups per molecule, and at least one N-vinyl imido group containing monomers. The coating is applied to at least one mold surface and the mold is closed for receiving the urethane elastomer. Following curing of the urethane elastomer, a coated, molded product is obtained which has improved scratch and solvent resistant properties on the surface or surfaces of the mold to which the in-mold coating was applied. The coating composition in combination with the elastomer, and the method disclosed in the present invention are especially well suited for coating plastic, optically clear lenses, i.e., those to be used in eye glasses.

6 Claims, No Drawings

IN-MOLD SCRATCH RESISTANT COATING FOR PEROXIDE CURABLE URETHANE ELASTOMERS

BACKGROUND OF THE INVENTION

1. Field of the Invention

The present invention relates generally to in-mold coatings and more particularly to the use of a radiation curable coating for the in-mold coating of peroxide-cured urethane elastomers. Still more specifically the present invention relates to an in-mold coating which includes a combination of monomers containing acryloloxy groups and at least an N-vinyl imido group.

2. Description of the Prior Art

Peroxide curable urethane elastomers are known to give properties similar to unsaturated polyester resins with the same ease of handling. Such urethane elastomers involve fully reacted urethane polymers that contain vinyl unsaturation, and the compositions are usually dissolved in vinyl monomers. Such urethane elastomers eliminate problems associated with other elastomer materials prepared from urethane resins in that they foam if moisture is encountered and the toxicity associated with free isocyanates is eliminated. Peroxide cured urethane elastomers are described in an article appearing in *Rubber & Plastics News,* June 29, 1987, pp. 18–19 and entitled "Peroxide-Cured Urethanes Offer Moca-Free Systems". The article was co-authored by the present inventor and two co-workers at Freeman Chemical Corporation.

While peroxide cured urethane elastomers offer substantial advantages in material handling and preparation and desirable properties for some applications, the optically clear aliphatic isocyanate-based urethane elastomers have excellent properties for the preparation of glass lenses and in particular for the preparation of lenses for eye glasses. However, the materials are subject to scratching and attack by a variety of solvents with which the materials may come into contact.

In unrelated chemical literature to that previously discussed, it is known that coatings which are radiation curable and which contain acryloloxy monomers and N-vinyl imido monomers can be applied as protective coatings for substrates, including eye glass plastics. U.S. Pat. No. 4,319,811 issued Mar. 16, 1982 to Tu, et al and entitled "Abrasion Resistance Radiation Curable Coating" describes such materials wherein the acryloloxy monomers consist of tri-acrylate and tetra-acrylate materials mixed with vinyl pyrrolidone or vinyl caprolactam. The patentee in this patent discloses the coating of plastic lenses made from cellulose acetate butyrate, cellulose acetate propionate, cellulose acetate, polycarbonate, polystyrene, methyl methacrylate, copolymers of styrene and methyl methacrylate, and allyl diglycol carbonate. Other plastic substrates are also disclosed, but the patent does not indicate that the coating of that invention can be used for polyurethane elastomers which are peroxide curable. Furthermore, as disclosed in the Tu, et al patent, the coating process is done by conventional techniques such as dip, spin, spray, curtain, gravure and roller coating techniques.

The assignee of the present invention has also discovered the advantageous properties of materials containing five and six acryloloxy groups per molecule and at least one N-vinyl imido containing monomer. A photo-initiator is provided if the cure is to be by ultraviolet light, while no photoinitiator is required if the cure is to be by electron beam. Preferably, the composition includes 65–95% of the polyfunctional material and from 5–35% of the imido group containing monomer. Films of such materials were found to have properties superior to those of the tri- or tetra-functional materials of the prior art and have the further advantage of reduced skin and eye irritation when compared to materials having a lower functionality.

It has not previously been suggested in the work done by the assignee of the present invention, or by the Tu, et al patent, that the radiation curable coatings could be advantageously used in an in-mold coating process to increase the scratch resistant and solvent resistant properties of peroxide curable urethane elastomers. A coating which provides such benefits would represent a substantial advance in the art.

OBJECTS AND SUMMARY OF THE PRESENT INVENTION

It is a principal object of the present invention to provide an in-mold coating composition for peroxide curable urethane elastomers.

Another object of the present invention is to provide a method for applying a scratch resistant coating, using the in-mold process, for peroxide curable urethane elastomers.

Another object of the present invention is to provide an in-mold coating process which eliminates the need for mold release agents in the coating composition.

A different object of the present invention is to provide a coating for peroxide curable urethane elastomers which increases the solvent resistance of the cast product.

A still further object of the present invention is to provide a coating for eye glass lenses molded from peroxide curable urethane elastomers.

How these and other objects of the invention are accomplished will be described in the following detailed description of the preferred embodiments of the present invention. Generally, however, the objects are accomplished by providing a relatively thin coating of the scratch and solvent resistant coating on at least one surface of a mold and curing the coating using ultraviolet light if a photoinitiator is included in the coating or curing by electron beams. The mold is then assembled and a peroxide curable urethane elastomer is injected into the mold and cured. The coating bonds to the elastomer during the curing process and the cured article is easily removed from the mold following cure. Upon testing for abrasion and solvent resistance, the portions of the molded article to which the coating has been applied have substantially improved scratch and solvent resistance and excellent adhesion as demonstrated by the cross-hatch adhesion test. Further ways in which the objects of the invention are accomplished will be described in the balance of the specification or will become readily apparent to those skilled in this art after the present specification has been read and understood.

DESCRIPTION OF THE DRAWINGS

There are no drawings in this application.

DETAILED DESCRIPTION OF THE PREFERRED EMBODIMENT

Before proceeding to a description of the coating method of the present invention and the ways in which coated articles may be prepared, the individual components useful in the present invention will be described.

Dealing first with the coating composition, those compositions described in the aforementioned Tu, et al patent may be used in the present invention including the tri- and tetra-functional acryloloxy containing monomers disclosed therein. Furthermore, the preferred material to be employed in the present invention is dipentaerythritol hexaacrylate represented by the following structural formula:

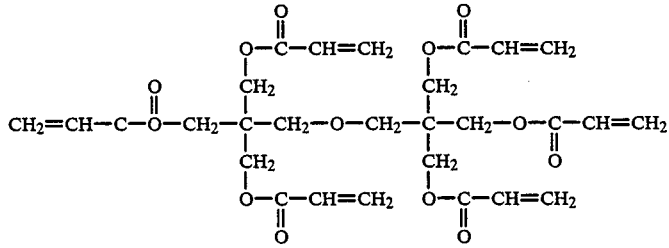

Also useful are the pentaacrylate materials represented, for example, by dipentaerythritol monohydroxy pentaacrylate. Mixtures of the various acryloloxy materials may also be employed.

The second component of the coating composition of the present invention is an N-vinyl imido containing monomer such as N-vinyl-2-pyrrolidone which, in testing, has been shown to give improved abrasion resistance over other imido group containing monomers tested. Other suitable monomers are disclosed in the Tu, et al patent and are considered to be within the scope of the present invention.

If ultraviolet light is to be used as the curing promoter for the coating composition of the present invention, photoinitiators are employed. Such photoinitiators include organic carbonyl compounds such as benzophenone, benzanthrone, benzoin and alkyl esters thereof, 2,2 diethoxyacetophenone, 2,2 dimethoxy 2 phenylacetophenone, p-phenoxy dichloroacetophenone, 2-hydroxycyclohexylphenone, 2-hydroxyisopropylphenone, 1-phenyl, 1,2 propanedione-2-(0-ethoxy carboxyl) oxime and copolymerizable benzophenone derivatives. If the cure is to be accomplished using peroxide catalysts, any well known peroxide catalyst can be added to the coating material. In some of the examples to be described below, dimethylbenzilketal (a photoinitiator sold under the trademark Irgacure ® 651 by Ciba Geigy Corporation) is used together with 2,5 dimethyol-2, 5-bis (2 ethyolhexanoylperoxy) hexane sold under the tradename Lupersol ® 256 by Pennwalt Corporation. The Lupersol ® material is a peroxide curing agent.

Suitable materials for use in preparing the peroxide curable urethane elastomers containing no free isocyanates include hydroxyl containing monomers well known in the urethane art together with isocyanate monomers or prepolymers as is also well known in the urethane art. The preferred peroxide-curable urethane elastomer of the present invention includes the reaction product of the following materials: 4 moles of isophorone diisocyanate, 2 moles of 1, 4 butane diol, 1 mole of polytetramethylene etherglycol (2000 MW), and 1 mole of caprolactone methacrylate. Other peroxide curable urethane elastomers include those prepare by reacting 4 moles of isophorone diisocyanate or dicyclohexyl 4, 4' methane diisocyanate with 2 moles of 1, 4 butane diol, 1 mole of diethylene glycol adipate ester diol, and 1 mole of caprolactone methacrylate or 2-hydroxyethylmethacrylate. 1% by weight of Lupersol ® 256 is used in the preferred embodiment as the peroxide curing agent. Heat and/or light exposure is used to accomplish the cure.

In the molding process of the present invention, two or more shaped elements cooperate to define a mold cavity. The in-mold coating composition is applied directly to one or more of the interior mold surfaces by conventional coating methods such as spray, dip, roll, coating, etc. Preferably the mold surface is then exposed briefly to ultra-violet light to harden the coating sufficiently to allow the mold to be assembled. The mold is then assembled with an opening to allow for injection of the elastomer resin composition. The mold is then heated to allow air bubbles to escape (which may have formed during the injection process) and then further to release the peroxide initiator and cure the urethane elastomer. During the cure, the ultra-violet coating bonds firmly to the UV cured or peroxide cured elastomer, but releases easily from steel, aluminum, glass and other mold contact surfaces. A release agent is not necessary in most cases, but for delicate or intricate molding operations, conventional release agents may be included. The present invention is especially well suited for the coating of plastic lens eye glasses, where the mold is an eye glass forming mold.

EXAMPLE 1

An in-mold coating composition consisting of 80 parts by weight dipentaerythritol hexaacrylate, 20 parts N-vinyl-2-pyrrolidone, 4 parts Irgacure ® 651 and 1 part Lupersol ® 256 was applied at 0.4 ml. thickness with a #8 wire wound steel rod to a 12"×12" clean glass plate. The coating was exposed to ultra-violet light by passing it under a 200 watt per inch mercury vapor lamp at a rate of 200 feet per minute.

A formed mold was then prepared by clamping a pre-shrunk cellophane film covered glass plate to the coated glass plate using a ⅛" thick Teflon ® spacer. The peroxide curable urethane elastomer referred to above as the preferred material, containing 1% by weight Lupersol ® 256 was poured into the mold cavity which was then placed for 15 minutes in a 50° C. over to allow air bubbles to come to the surface. The mold was then heated to 100° for two hours to accomplish the final cure.

On the side which had been in contact with the cellophane film, the cured casting was easily scratched by two-three rubs with #0 steel wool and was readily softened by methyl ethyl ketone. The side of the casting having the hard coating released easily from the glass plate and was not scratched by 20 rubs using #0 steel wool. In addition, there was no softening or delamination after 100 double rubs with methyl ethyl ketone.

EXAMPLE 2

An in-mold coating composition was prepared by combining 76 parts dipentaerythritol hexaacrylate, 20 parts N-vinyl-2-pyrrolidone, 4 parts ethylene glycol ethyl-ether acetate. The composition was applied to a clean glass plate by spraying using a standard spray painting device. After allowing solvent to flash off for ten to fifteen minutes at 75° C., the coating was cured by UV radiation and the mold cavity was constructed as in Example 1. The peroxide curable urethane resin of Example 1 was injected into the mold and cured for two hours at 100° C. The uncoated side of the casting was "rough" and scratched severly by rubbing with #0 steel wool. The UV coated side had a smooth feel and showed very slight scratching after repeated rubbing with #0 steel wool. The coating could not be removed by cross-hatching and pulling with Scotch® #600 adhesive tape supplied by The 3M Company using standard techniques for cross-hatch adhesion testing.

EXAMPLE 3

The coating composition used in Example 2 was applied to a clean glass plate and solvent was allowed to flash off and cure was accomplished under 40 watt per inch mercury vapor lamps. The urethane casting resin of Example 1 was modified by adding 0.3% Darocure® 1173 ultra-violet light photoinitiator (supplied by E. Merck Co., Darmstadt, West Germany) substituted for the Lupersol® 256. The casting was cured for ten minutes under 40 watt per inch lamps. The cured casting had a Shore D hardness of 42 and the uncoated side scratched easily, while the coated side gave only very slight scratching with #00 steel wool.

EXAMPLE 4

An in-mold composition consisting of 80 parts by weight pentaerythritol triacrylate, 20 parts N-vinyl-2-pyrrolidone, 4 parts Irgacure® 651, 100 parts acetone and 0.1 part FC 430 (a flourocarbon flow and levelling additive sold by The 3M Company) was applied to a glass plate and a polished steel plate. Following application the coating was allowed to stand ten minutes at 25° C. and then cured under 200 watt per inch UV lamps at 20 feet per minute. A mold cavity was formed as in the previous examples using the glass and steel plates here. The UV curable casting resin of Example 3 was placed into the cavity and cured by exposure to 40 watt per inch lamps for ten minutes. The cured casting released with ease from the steel and glass and had a Shore D hardness of 62. The film did not crack when the casting was bent 90°, and neither surface could be scratched with #0 steel wool. Cross-hatch adhesion to both sides was 100%. The coating was not softened by 100 double rubs with methyl ethyl ketone.

The present invention has been illustrated by four working examples and several different coating compositions, but its scope is not be limited thereby. Rather, the invention is to be limited solely by the scope of the claims which follow.

What is claimed is:

1. A molded article prepared by
   providing a mold having a plurality of mold surfaces;
   coating at least one of said mold surfaces with a coating composition consisting essentially of a composition comprising at least one polyfunctional monomer having three of more acryloloxy groups per molecular and at least one N-vinyl imido group containing monomer and a catalyst selected from the group consisting of peroxide catalysts and photoinitiators;
   curing said coating composition using heat if a peroxide catalyst is employed or ultra-violet light if a photoinitiator is employed;
   injecting a peroxide curable urethane elastomer composition into said mold;
   curing said peroxide curable urethane elastomer to harden same and to bond same to said coating; and
   removing said coated article from said mold.

2. The molded article of claim 1 wherein the polyfunctional monomer comprises five or six acryloloxy groups per molecule.

3. The molded article set forth in claim 2 wherein said polyfunctional monomer is dipentaerythritol hexaacrylate.

4. The molded article set forth in claim 1 wherein said coating composition includes N-vinyl-pyrrolidone as the imido containing monomer.

5. The molded article set forth in claim 1 wherein more than one of said mold surfaces are coated with said coating composition.

6. The molded article set forth in claim 1 wherein said mold comprises a mold for eye glass lenses.

* * * * *